Aug. 27, 1963 W. S. ELLIOTT 3,102,237

PROPORTIONAL NOISE LIMITER

Filed Feb. 10, 1961 2 Sheets-Sheet 1

INVENTOR.
WILLIAM S. ELLIOTT
BY Moody & Anderson
AGENTS

INVENTOR.
WILLIAM S. ELLIOTT
BY Moody & Anderson
AGENTS

United States Patent Office 3,102,237

Patented Aug. 27, 1963

3,102,237

PROPORTIONAL NOISE LIMITER

William S. Elliott, Cedar Rapids, Iowa, assignor to Collins Radio Company, Cedar Rapids, Iowa, a corporation of Iowa Filed Feb. 10, 1961, Ser. No. 88,512

5 Claims. (Cl. 325—482)

This invention relates generally to noise limiters and more particularly to an improved noise limiter for maintenance of a specified signal plus noise-to-noise ratio in a receiver in the presence of interfering pulse demodulation products at the output of a receiver detector.

The signal plus noise-to-noise ratio in a receiver may be seriously compromised should a pulse-modulated carrier be received at the same frequency as that of a desired signal modulated carrier. The detected pulses may cause an appreciable increase in energy and compromise the signal plus noise-to-noise ratio at low levels of the desired carrier.

It is an object therefore of the present invention to provide an improved noise limiter which increases the ratio of signal energy to pulse interference energy over varying input signal levels by providing noise limiter operation proportional to the percentage of carrier modulation rather than at a fixed modulation level.

The present invention is featured in the development of a reference voltage which is proportional to the percentage of modulation of the carrier but independent of the amplitude of interfering pulses or noise amplitude perturbations which would normally be superimposed on the desired signal at the detector output.

These and other objects and features of the present invention will become apparent upon reading the following description in conjunction with the accompanying drawings in which.

The circuitry generally functions to provide proportional limiting action by developing a direct-current voltage reference with amplitude proportional to that of the detected signal peak voltage, the conversion of the detected signal voltage to an alternating-current wave with peak amplitude related to that of the signal voltage by a proportionality factor like that of said direct-current reference, the combination of the direct-current reference voltage and the latter alternating-current signal, and the subsequent limiting of the composite signal with respect to a common reference level by which noise amplitude perturbations upon the desired signal may be clipped to decrease the noise energy component and increase the signal plus noise-to-noise ratio.

Figure 1:
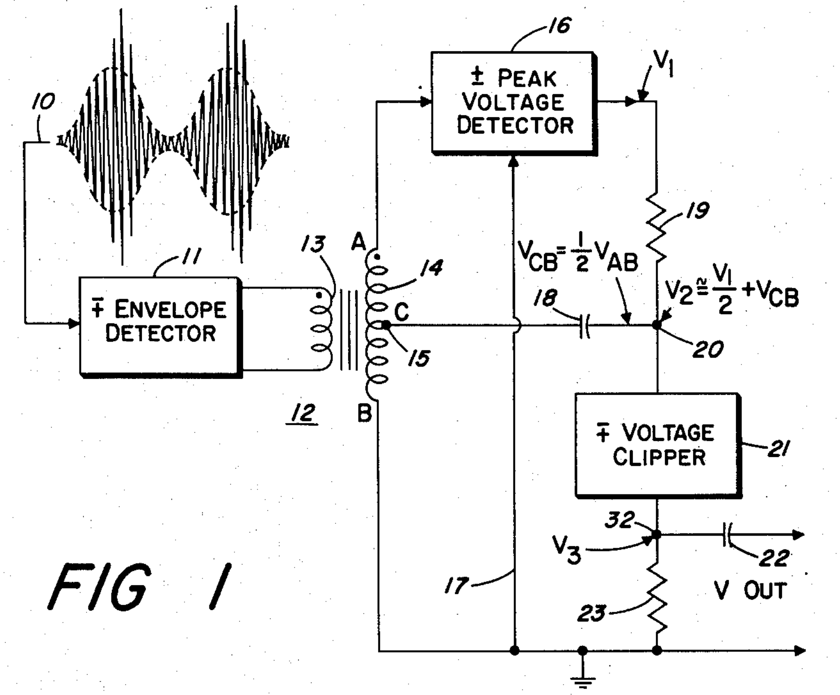
FIGURE 1 is a functional diagram of the invention.

The invention is shown functionally in FIGURE 1 and is adaptable for operation with envelope detectors to improve the signal plus noise-to-noise ratio. Noise pulses normally appear as amplitude perturbations on the modulated carrier and may appear on the detected envelope. FIGURE 1 shows an envelope detector 11 to which a source 10 of amplitude modulated waves is applied as in conventional receivers. Detector 11 may be one developing either a positive or negative envelope output with respect to ground. The invention is adaptable to receive either positive or negative detector output signal. Thus, detector 11 is indicated as being either a negative or a positive $\mp$ envelope detector. The output from detector 11 is applied to the primary winding 13 of a transformer 12 such that an alternating-current signal $V_{AB}$ is developed across the secondary winding 14. A peak voltage detector 16 is connected across the secondary winding 14 of transformer 12 and functions to develop an output $V_1$ equal to the positive or negative peak of the voltage $V_{AB}$. It is to be noted that detector 11 is indicated as being $\mp$ (minus or plus), while peak voltage detector 16 is indicated as being $\pm$ (plus or minus). In accordance with the present invention these polarities are so indicated to define the operation of peak detector 16 as that of detecting the peak of the alternating-current voltage $V_{AB}$ which does not include the noise pulse amplitude variations. On the assumption that there is no phase reversal across the transformer 12, if envelope detector 11 produces a negative output, then peak detector 16 measures the positive peak of $V_{AB}$. Conversely, if detector 11 develops a positive output, peak detector 16 measures the negative peak of $V_{AB}$. The voltage $V_1$ measured by detector 16 is thus a direct-current voltage reference proportional to the percentage of modulation of the carrier wave and is not effected or modified by noise pulse amplitude perturbations.

The peak reference voltage $V_1$ is applied across a voltage divider comprised of resistor 19, voltage clipper 21 and resistor 23. Clipper 21 might be a diode member so polarized as to provide a low impedance path when forwardly biased. The clipper 21 is indicated as being a $\pm$ (plus or minus) clipper since it functions to block negative signals if peak detector 16 provides a positive output $V_1$, and vice versa. Except for the small voltage drop introduced by the forward resistance of clipper 21, the direct-current voltage level of voltage $V_3$ essentially equals the direct-current voltage level at junction 20 and may be made to be equal to a predetermined proportion of reference voltage $V_1$ by choice of resistors 19 and 23. Thus, resistors 19 and 23 might be equal such that the direct-current voltage level at junction 20 equals $$\frac{V_1}{2}$$

with the level at junction 32 being substantially the same.

A predetermined proportion of the alternating-current signal $V_{AB}$ developed in the transformer secondary winding 14 is applied to junction 20 through a direct-current blocking capacitor 18. Thus, secondary winding 14 might include a center tap 15 such that an alternating-current voltage $$V_{CB}=\frac{V_{AB}}{2}$$

is applied to junction 20. The resultant composite voltage, $V_2$, at junction 20 then becomes substantially equal to $$\frac{V_1}{2}+V_{CB}$$

and includes the noise pulses in the $V_{CB}$ component. As long as the voltage $V_2$ is positive with respect to ground, negative clipper 21 conducts and the alternating-current $V_{CB}$ appears at junction 32 as voltage $V_3$. When the voltage $V_2$ goes negative with respect to ground, as when noise pulse appears in $V_{CB}$, the clipper 21 is reverse biased and the pulse is clipped off the signal $V_3$ appearing at junction 32. Capacitor 22 couples the signal $V_3$ to the output, wherein the alternating-current signal $V_{out}$ is developed.

Figure 2:
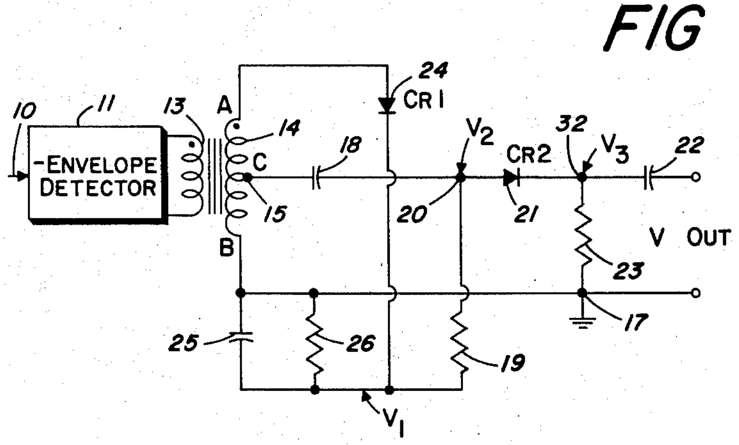
FIGURE 2 is a schematic diagram of an embodiment of the present invention.

An embodiment of the invention utilizing the first combination of the polarity alternatives of FIGURE 1 is shown schematically in FIGURE 2. FIGURE 2 operates in conjunction with a negative envelope detector 11 such that noise pulses superimposed on the desired signal envelope are negative-going voltage variations. The output from detector 11 is applied through transformer 12 to remove the direct-current voltage reference. The voltage $V_{AB}$ across secondary winding 14 might then be that illustrated as waveform A of FIGURE 3, and be comprised of an audio signal $V_{AB}$ having a sinusoidal amplitude variation 30 with noise pulses 31 appearing on the negative portions thereof.

The peak voltage detector 16 of FIGURE 1 is shown in FIGURE 2 as a positive peak voltage detector comprised of a diode 24 in series with capacitor 25 shunting the secondary winding 14 of transformer 12, with capacitor 25 being shunted by a load resistor 26. Diode 24 is so polarized, and the value of capacitor 25 so chosen, that a voltage is developed across capacitor 25 with polarity such that the reference $V_1$ is a measure of the positive peaks of $V_{AB}$. As shown in FIGURE 3(A), the positive peaks of $V_{AB}$ do not include the noise pulses and thus $V_1$, as illustrated in FIGURE 3(B) is a positive reference proportional to the percentage of carrier modulation and unaffected by the presence of noise pulse 31. Positive reference voltage $V_1$ is applied through resistor 19, diode 21 and resistor 23 to common ground 17 such that approximately one-half of $V_1$ appears at junction 20. The alternating-current voltage $V_{CB}$ from transformer center tap 15 is applied through capacitor 18 to junction 20 with respect to common ground 17. Voltage $V_{CB}$ is indicated in FIGURE 3(C) as being an alternating-current voltage with one-half the amplitude of the transformer secondary voltage $V_{CB}$ such that the composite voltage $V_2$ is that illustrated in FIGURE 3(D) and includes the direct-current voltage component $$\frac{V_1}{2}$$

Voltage $V_2$ is noted to be positive except for the negative-going noise pulses. Thus, the waveform of FIGURE 3(E) appears at junction 32 as voltage $V_3$ which corresponds to the voltage $V_2$ with the negative-going position clipped by diode 21. The clipping actually takes place approximately 0.5 volt ($V_{CR2}$) above zero reference due to the inherent diode threshold. Voltage $V_3$ is taken through capacitor 22 to remove the direct-current reference and thus the output $V_{out}$ (FIGURE 3(F)) is seen to be the audio signal of FIGURE 3(C) with the noise pulses eliminated.

Figure 3:
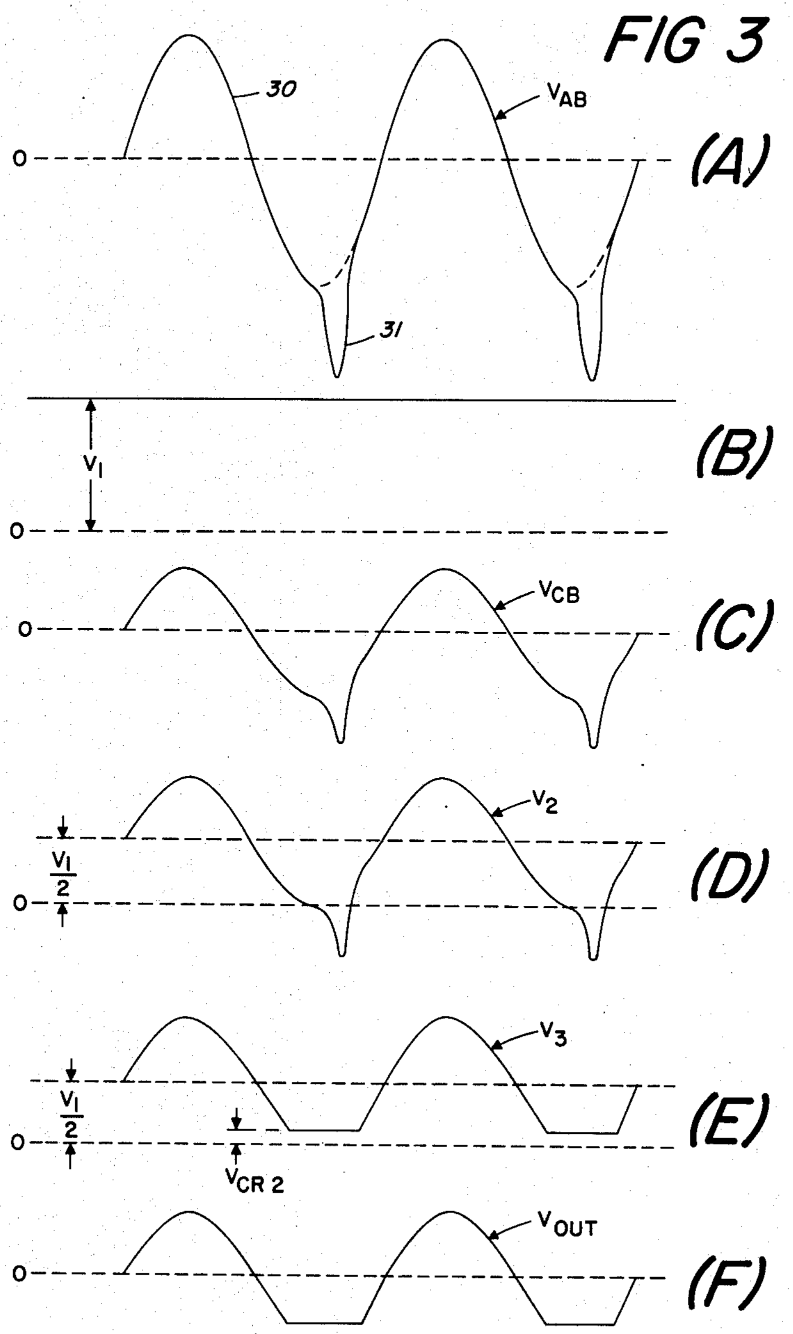
FIGURE 3 represents operational waveforms related to the embodiment of FIGURE 2.

It is to be realized that the waveforms of FIGURE 3 are exaggerated and idealized, and that, in effect, the noise perturbations on the detector envelope are not entirely removed when occurring in time other than at the peaks of the audio signal. The circuit however, regardless of the time occurrence of pulses, functions to eliminate portions of noise pulse energy from the output and, in reducing the noise energy content, serves to improve the signal plus noise-to-noise ratio.

Were the invention to be utilized in conjunction with a positive envelope detector 11, the reference voltage $V_1$ would be a negative peak reference and the clipper 21 would block positive signals with respect to common ground. This application would necessitate only a reversal of the illustrated polarization of diodes 24 and 21 in FIGURE 2.

It may be further seen that the invention need not be limited to the choice of resistors 19 and 23 which results in one-half of reference $V_1$ being developed at voltage divider junction 20 and the illustrated center-tapped transformer to develop a superimposed $V_{CB}$ having a peak amplitude one-half that of reference $V_1$. The invention is seen to necessitate only that the voltage dividing ratio and the peak voltage proportion of $V_{CB}$ be the same. For example, by choice of resistors 19 and 23, the direct-current level of the voltage appearing at junction 20 might be one-third of $V_1$ and transformer secondary winding 14 be tapped such that $V_{CB}$ is one-third of $V_{AB}$. Further, a capacitor and voltage divider network might be used in lieu of the transformer to perform the functions of removing the direct-current component of the detector output and voltage division, respectively. In general, the voltage $V_2$ is a composite of the detector audio signal and peak voltage level which might be expressed as $$V_2=\frac{V_1}{n}+\frac{V_{AB}}{n}$$

where $V_1$ is the peak direct-current level of the audio signal $V_{AB}$ and $n$ is a common proportionality factor.

The present invention is thus seen to provide a non-complex noise limiter for increasing the ratio of signal energy to noise interference energy. The invention provides noise limiting action proportional to the percentage of carrier modulation rather than at a fixed modulation level. Although the invention has been described with respect to a particular embodiment thereof, it is not to be so limited, as changes might be made therein which fall within the scope of the invention as defined by the appended claims.

I claim:

1. In combination with an amplitude modulation detector of the type providing a direct-current voltage output of predetermined polarity, means for improving the signal plus noise-to-noise ratio of said detector output in the presence of noise amplitude perturbations thereon; comprising means for converting said detector output signal to an alternating-current signal with respect to a fixed reference potential, peak voltage detecting means receiving said alternating-current signal and developing therefrom a direct-current reference potential with amplitude proportional to the amplitude of those peaks of said alternating current signal having a polarity opposite that of said predetermined polarity means for combining like predetermined portions of the magnitudes of each of said direct-current reference and alternating-current voltages, voltage clipping means associated with said voltage combining means and being adapted to block passage therethrough of those portions of said combined voltage with magnitudes in exces of and with polarity opposite that of said fixed reference potential, and an output terminal connected to said voltage clipping means whereby the voltage developed at said output terminal is proportional to the output from said amplitude detector with predetermined portions of said noise amplitude perturbations removed therefrom.

2. In combination with an amplitude modulation detector of the type providing a variable direct-current output of predetermined polarity, means for improving the signal plus noise-to-noise ratio of said detector output in the presence of noise perturbations thereon; comprising means for converting the variable direct-current voltage detector output to an alternating-current signal, means receiving said alternating-current signal and developing therefrom a direct-current voltage of polarity opposite that of said detector output and with magnitude proportional to the peaks of said alternating-current signal and independent of said noise amplitude perturbations, voltage dividing means receiving said reference direct-current voltage and including a junction point at which a predetermined percentage of said reference direct-current voltage is developed, means for applying a like percentage of said alternating-current voltage to said voltage divider junction point whereby said junction point voltage is determined by said predetermined portions of said reference direct-current voltage and said alternating-cuurrent voltage, voltage clipping means associated with said voltage dividing means, said voltage clipping means being adapted to block those portions of said alternating-current signal being applied to said voltage dividing means with magnitudes in excess of that defined by said predetermined portion of said reference direct-current voltage, an output terminal, said voltage clipping means being connected between said voltage divider junction point and said output terminal.

3. In combination with an amplitude modulation detector of the type producing a direct-current output of predetermined polarity and with amplitude proportional to the envelope of a modulated carrier input thereto; means for improving the signal plus noise-to-noise ratio of said detector output in the presence of noise amplitude perturbations thereon comprising, means for converting the detector output signal to an alternating-current signal, a peak voltage detector receiving said alternating-current signal and producing a reference direct-current voltage with polarity opposite that of said detector output and with amplitude proportional to the percentage of modulation of said carrier and independent of the amplitude of said noise perturbations, voltage dividing means, said voltage dividing means comprising a plurality of resistance members and including an intermediate junction point, voltage clipping means serially connected between one of said resistive members and said junction point, said voltage dividing means developing a predetermined portion of said reference direct-current voltage at said junction point, means for applying a like predetermined portion of said alternating-current signal to said junction point, said voltage clipping means being adapted to block passage through said one resistance member of signal with polarity opposite that of said reference direct-current voltage, and an output terminal connected to the junction between said voltage clipping means and said one resistive member.

4. In combination with an amplitude modulation detector of the type providing a direct-current output of predetermined polarity and with amplitude proportional to the envelope of a modulated carrier input thereto; means for improving the signal plus noise-to-noise ratio of said detector output in the presence of noise amplitude perturbations thereon; comprising means for developing a reference direct-current voltage with amplitude proportional to the percentage modulation of said carrier and independent of the amplitude of said noise perturbations, voltage dividing means connected across said reference voltage, said voltage dividing means comprising a plurality of resistance members including first and second resistance members and a unilateral conduction device serially connected between said first and second resistance members, said unilateral conduction device being like-polarized with respect to said reference direct-current voltage whereby the voltage at the junction between said first resistance member and said unilateral conduction device is substantially equal that between said unilateral conduction device and said second resistance member and is defined as a predetermined portion of said reference direct-current voltage, means for converting said detector output voltage to an alternating-current voltage, means for applying a like predetermined portion of said alternating-current voltage across said unilateral conduction device and that portion of said voltage dividing means including said second resistance member, and an output connected to the junction between said unilateral conduction device and said second resistance member.

5. In combination with an amplitude modulation detector of the type providing a direct-current output with amplitude proportional to the envelope of a modulated carrier input thereto; means for improving the signal plus noise-to-noise ratio of said detector output in the presence of noise amplitude perturbations thereon; comprising alternating-current voltage transforming means receiving the output of said detector, a peak voltage detector connected across the output of said transforming means, voltage dividing means connected across the output of said peak voltage detector; said voltage dividing means comprising a first resistance section, a unilateral conduction device and a second resistance section respectively serially connected, said first resistance section connected to said peak voltage detector, said unilateral conduction device being polarized so as to be forward biased by said peak voltage detector whereby a predetermined portion of the output from said peak voltage detector is collectively developed across unilateral conduction device and second resistance section; means respectively serially connecting a predetermined portion of said voltage transforming means output with said unilateral conduction device and said second resistance section, and an output signal taken across said second resistance section.

References Cited in the file of this patent

UNITED STATES PATENTS 2,345,762 Martinelli ---------------- Apr. 4, 1944